US009542631B2

(12) United States Patent
Kolman et al.

(10) Patent No.: US 9,542,631 B2
(45) Date of Patent: Jan. 10, 2017

(54) DUAL FREQUENCY HF-UHF IDENTIFICATION DEVICE, IN PARTICULAR OF THE PASSIVE TYPE

(71) Applicant: EM Microelectronic-Marin S.A., Marin (CH)

(72) Inventors: Jiri Kolman, Prague (CZ); Goran Stojanovic, Neuchatel (CH); Tomas Marek, Sulice-Hlubocinka (CZ)

(73) Assignee: EM Microelectronic-Marin S.A., Marin (CH)

( * ) Notice: Subject to any disclaimer, the term of this patent is extended or adjusted under 35 U.S.C. 154(b) by 118 days.

(21) Appl. No.: 14/677,193

(22) Filed: Apr. 2, 2015

(65) Prior Publication Data
US 2016/0292556 A1   Oct. 6, 2016

(51) Int. Cl.
G06K 19/07 (2006.01)
G06K 19/077 (2006.01)

(52) U.S. Cl.
CPC ....... *G06K 19/0715* (2013.01); *G06K 19/0724* (2013.01); *G06K 19/07786* (2013.01); *G06K 19/07794* (2013.01)

(58) Field of Classification Search
CPC ................................................. G06K 19/0724
USPC .......................................................... 235/492
See application file for complete search history.

(56) References Cited

U.S. PATENT DOCUMENTS

| 8,456,282 | B2* | 6/2013 | Burkart | G06K 19/0701 340/10.34 |
| 2013/0247117 | A1* | 9/2013 | Yamada | G08C 17/02 725/93 |

* cited by examiner

*Primary Examiner* — Toan Ly
(74) *Attorney, Agent, or Firm* — Oblon, McClelland, Maier & Neustadt, L.L.P.

(57) ABSTRACT

The dual frequency RF identification device comprises an HF antenna for receiving an HF electromagnetic field, an HF interface, an UHF antenna for receiving an UHF electromagnetic field, an UHF interface, non-volatile memory means formed by a first non-volatile memory and a second non-volatile memory. The first non-volatile memory can be in an active state without the second non-volatile memory being powered and consumes substantially more power than this second non-volatile memory. The first non-volatile memory comprises all data needed for a device configuration allowing this device to carry out at least a communication mode of an UHF protocol, this communication mode having access to the first non-volatile memory but not to the second non-volatile memory. The first non-volatile memory further comprises all attributes needed for a configuration of this communication mode.

16 Claims, 2 Drawing Sheets

DUAL FREQUENCY HF-UHF IDENTIFICATION DEVICE, IN PARTICULAR OF THE PASSIVE TYPE

FIELD OF THE INVENTION

The present invention concerns the domain of dual frequency HF-UHF identification device, in particular of the passive type. Such a RFID device is also named RFID transponder or RFID tag and can be incorporated in a card or in any other portable device, e.g. a wristwatch.

In particular, the present invention concerns a dual frequency HF-UHF identification device having an HF interface and an UHF interface and intended to communicate independently with a UHF reader and a HF reader.

BACKGROUND OF THE INVENTION

The international patent application WO 2011/159171 describes a passive RFID device with an UHF interface comprising an UHF antenna and a dual frequency LF-HF Interface comprising a LF antenna and a HF antenna. The dual frequency LF-HF Interface carries out a IP-X protocol in which only a LF demodulator and a HF modulator is used. It is to be noted that the dual frequency LF-HF interlace is intended to communicate with a single dual frequency reader. The passive RFID device further comprises a UHF rectifier and a LF rectifier which can both generate a power supply for this device. More particularly, a decision circuit is provided for selecting either the LF rectifier or the UHF rectifier as power generator depending on which one delivers the largest signal.

The passive RFID device further comprises a controller formed by a UHF logic unit, a IP-X logic unit and a single shared non-volatile memory (EEPROM). The device is arranged for detecting which kind of readers is present and for responding accordingly. More particularly, depending on which energy source is present and the strength of that energy source, the controller select either the UHF logic unit or the IP-X logic unit or both and executes respectively a UHF protocol, a IP-X protocol or both. According to the document WO 2011/159171, it is an important aspect that the same data be delivered to both UHF and dual frequency readers. For this purpose, a single EEPROM memory is used by each protocol and fully shared between the UHF logic unit and the IP-X logic unit. In order to allow such a full sharing of the single EEPROM memory, a different mapping is provided for both protocols.

This prior art RFID device has some drawback, a major one being the fact that the sensitivity of the UHF interface is relatively low due to the fact that there is a single non-volatile memory (also named NVM in the following text) which is accessed by both interfaces. Indeed, the whole EEPROM memory is powered when one or the other interface carries out its corresponding protocol. This is a problem because the IP-X protocol or more generally a LF or HF protocol needs a relatively big non-volatile memory which consumes a relative high power. The activation of such a big NVM and the access to this memory is power hungry, so that the power level needed for carrying out the UHF protocol is much higher than in a UHF system formed by a UHF transponder and a UHF reader. As a consequence, the distance of communication for a UHF communication in the system proposed by WO 2011/159171 is shorter than the corresponding distance of the mentioned UHF system.

SUMMARY OF THE INVENTION

The aim of the present invention is to overcome the drawbacks of the cited prior art document and thus to provide a RFID device capable of communicating independently with an HF reader and an UHF reader in an efficient manner, in particular concerning the UHF communication wherein the power received by the RFID device from a UHF reader is generally lower than for a HF communication which is normally intended to occur at relative short distance.

The present invention concerns a dual frequency RF identification device comprising an HF antenna for receiving an HF electromagnetic field, an HF interface, an UHF antenna for receiving an UHF electromagnetic field, an UHF interface, non-volatile memory means, device reset means, a power generator and a power management unit, the HF interface being arranged for carrying out an HF protocol and the UHF Interface being arranged for carrying out an UHF protocol. The non-volatile memory means are formed at least by a first non-volatile memory and a second non-volatile memory, the identification device being arranged so that the first non-volatile memory can be powered and be in an active state without activating the second non-volatile memory, the first non-volatile memory consuming substantially a first power in a read mode and the second non-volatile memory consuming substantially a second power in a read mode, the second power being substantially higher than the first power. The first non-volatile memory comprises all data needed for a device configuration allowing this device to carry out at least a communication mode of the UHF protocol, this communication mode having access to the first non-volatile memory but not to the second non-volatile memory, the first non-volatile memory further comprising all attributes needed for a configuration of the communication mode of the UHF protocol.

Then, the power management unit is arranged for detecting:
a first determined power level provided by the power generator and required for the communication mode of the UHF protocol to be carried out by the device,
at least a second determined power level provided by the power generator and substantially higher than the first determined power level, this second determined power level being required for a communication mode of the HF protocol with an access at least to the second non-volatile memory to be carried out by the device.

The identification device is further arranged for allowing the configuration of the communication mode of the UHF protocol and then an execution of this communication mode when the power provided by the power generator is equal or superior, in particular above and near to the first determined power level. Finally, this device is arranged for allowing a full activation of the HF Interface together with the second non-volatile memory only when the power provided by the power generator is equal or superior to the second determined power level.

According to a general embodiment, the identification device is arranged for allowing the device reset means to be activated and then the device configuration to be executed when the power provided by the power generator is equal or superior, in particular above and near to the first determined power level. The device is arranged so that the activation of the device reset means occurs before the configuration of the communication mode of the UHF protocol.

According to a preferred embodiment, the communication mode of the UHF protocol is a limited UHF communication mode, i.e. with a limited access to the non-volatile memory means, and the UHF interface can further carry out an extended UHF communication mode of the UHF protocol with an additional access to the second non-volatile memory when the power provided by the power generator is equal or superior, in particular above and near to a third determined power level higher than the first determined power level. The power management unit is arranged for detecting this third determined power level and for allowing an activation of the second non-volatile memory only when the power provided by the power generator is equal or superior to the third determined power level. In this preferred embodiment, attributes relative to the second non-volatile memory for a configuration of the extended UHF communication mode are stored in this second non-volatile memory.

According to a particular variant of the above-mentioned preferred embodiment, the identification device is arranged for executing at least partially the configuration of the extended UHF communication mode when the second non-volatile memory is in an active mode and only if an access command concerning this second non-volatile memory is received through the UHF interface.

In another embodiment, the identification device further comprises a HF field detector and this device is arranged for allowing an activation of the HF Interface only when the power provided by the power generator is equal or superior to the second power level and when an HF field is detected by the HF field detector.

According to a main embodiment, the identification device is of the passive type and the power generator comprises first rectifying means for a received UHF electromagnetic field and second rectifying means for a HF electromagnetic field. The first rectifying means provides a supply voltage to the device at least when the power generated by the first rectifying means is higher than the power generated by the second rectifying means.

The invention also concerns a configuration method of the identification device of the invention, wherein the device reset means are activated when the first determined power level is detected by the power management unit after a power-down state of this identification device and then the device configuration is automatically executed.

In a particular implementation of the configuration method, this configuration method has a step wherein the configuration of a communication mode of the UHF protocol is automatically and directly executed after the device configuration if the power provided by the power generator remains equal or superior to the first determined power level.

BRIEF DESCRIPTION OF THE DRAWINGS

The present invention will be described subsequently with reference to the attached drawing, given by way of example, but in no way limited thereto, in which.

DETAILED DESCRIPTION OF THE INVENTION

Figure 1:
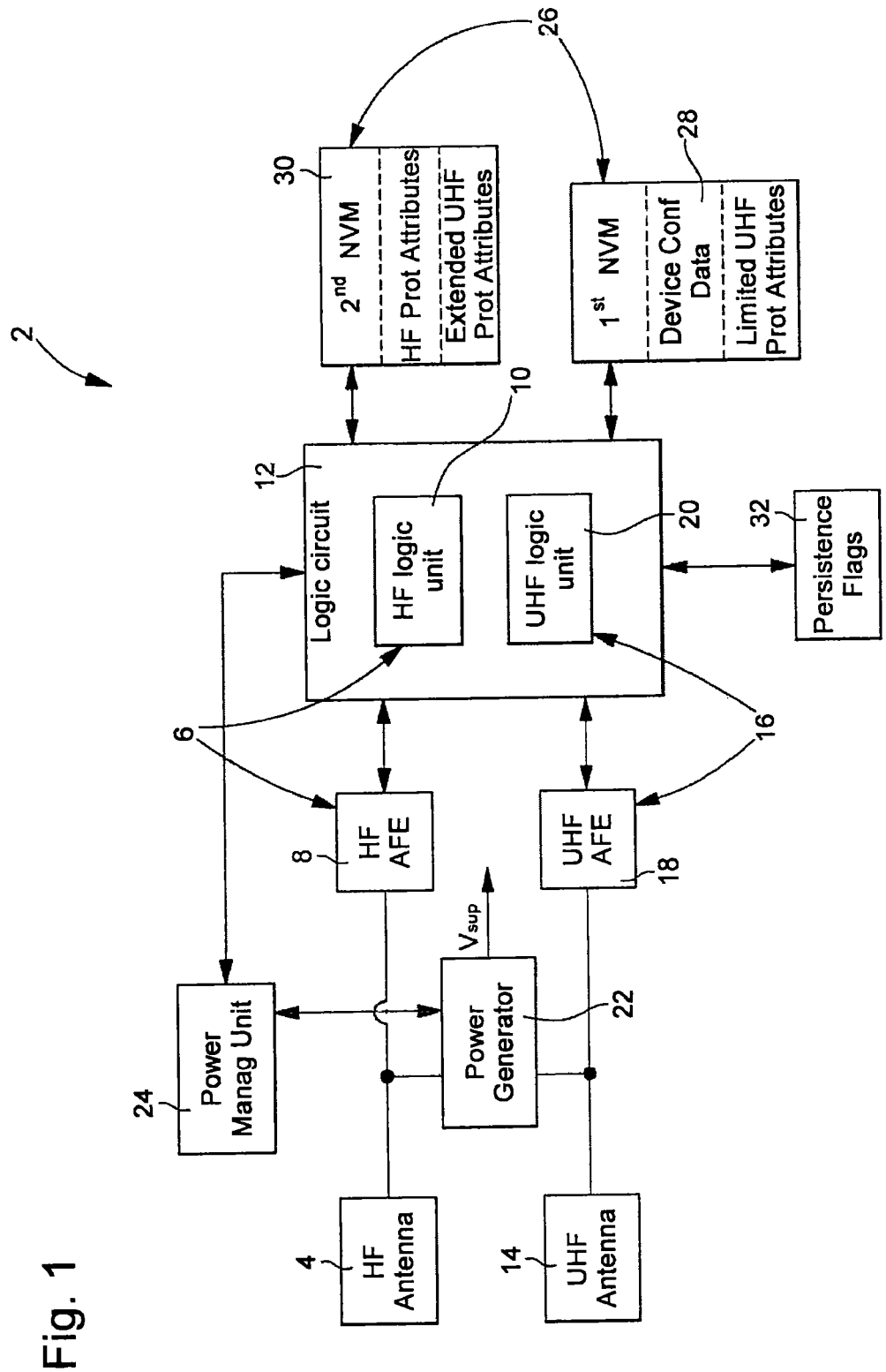
FIG. 1 is a schematic representation of an embodiment of a dual frequency RF identification device according to the invention.
Figure 2:
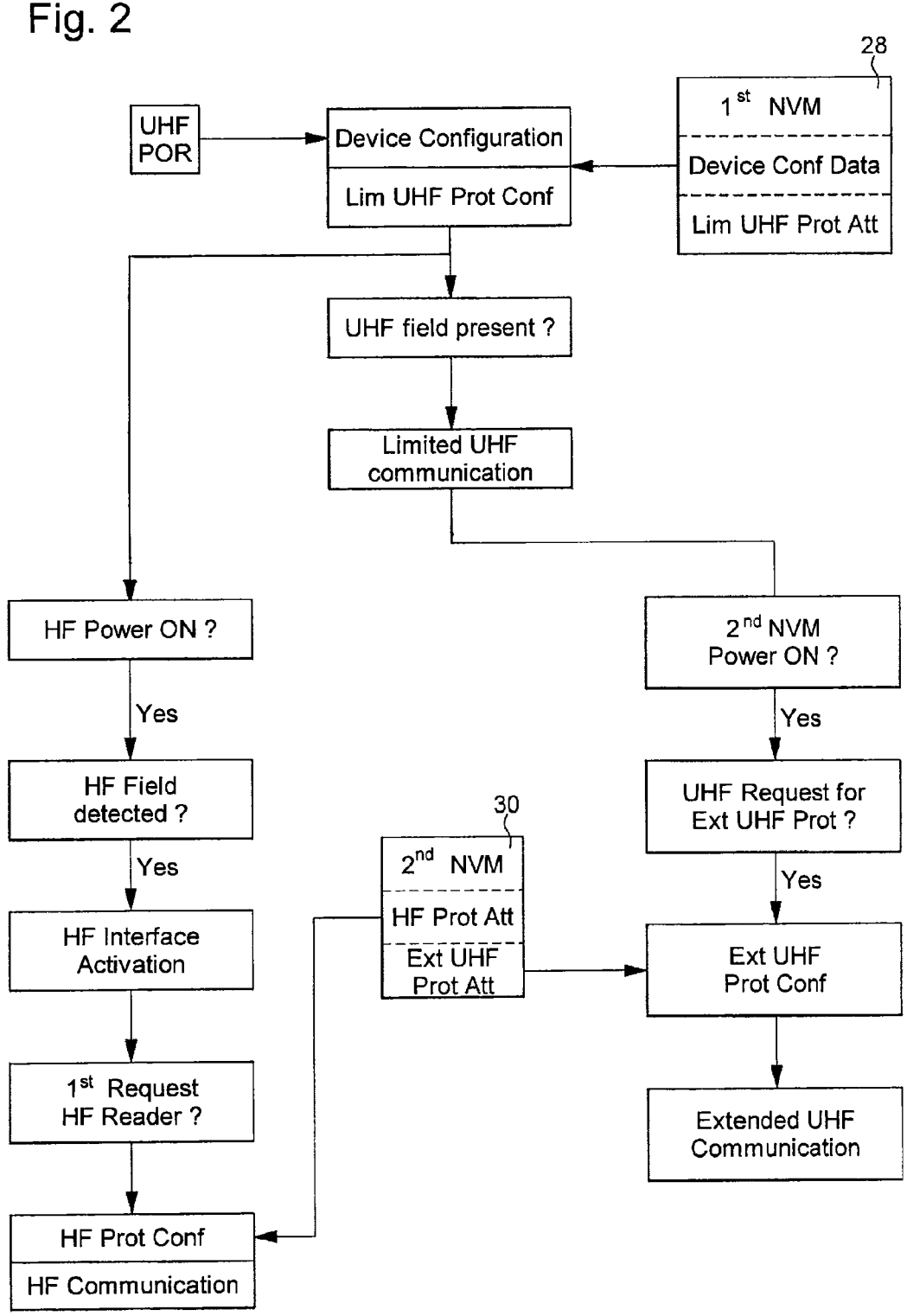
FIG. 2 is a block-diagram of an implementation of an activation and configuration method according to the invention for the identification device of FIG. 1.

With reference to FIGS. 1 and 2, an embodiment of the invention will be described as well as a few examples and variants in a no limited manner.

The passive HF-UHF identification device 2 comprising an HF antenna 4 for receiving an HF electromagnetic field, an HF interface 6 formed by an HF analog front end 8 (HF AFE) and an HF logic unit 10 which is part of the global logic circuit 12. The device 2 also comprises an UHF antenna 14 for receiving an UHF electromagnetic field, an UHF interface 16 formed by an UHF analog front end 18 (UHF AFE) and an UHF logic unit 20 which is also part of the logic circuit 12. The device 2 further comprises non-volatile memory means 26, device reset means supported by the logic circuit 12, a power generator 22 providing a supply voltage $V_{sup}$ and a power management unit 24. The HF interface is arranged for carrying out an HF protocol and the UHF Interface is arranged for carrying out an UHF protocol. The non-volatile memory means are formed at least by a first non-volatile memory 28 ($1^{st}$ NVM 28) and a second non-volatile memory 30 ($2^{nd}$ NVM 30). The logic circuit 12 supports operations common to both interfaces 6 and 16 or dedicated to one or the other of these interfaces, as well as general functions in relation to the power management unit, the non-volatile memories and persistence flags 32. These persistence flags are part of the analog circuit and formed by capacitors.

In a main embodiment, the UHF protocol is related to the EPC protocol and the HF protocol is related to the NFC protocol, both EPC and NFC protocols being well known from the person skilled in the art.

The power generator is arranged so that the passive device 2 can harvest power from an incoming HF electromagnetic field received by the HF antenna and from an incoming UHF electromagnetic field received by the UHF antenna. Thus, the power generator comprises first rectifying means for a received UHF electromagnetic field and second rectifying means for a received HF electromagnetic field. The power generator and the power management unit are arranged so that the first rectifying means provides a supply voltage to the device at least when the power generated by the first rectifying means is higher than the power generated by the second rectifying means. The power management unit is arranged for detecting at least if the available power has reached certain determined power levels and to communicate this information to the logic circuit 12, i.e. this power management unit is sensing the power level that the power generator can provide to the passive device 2. In a first variant, the power generator is arranged so that both HF and UHF fields can simultaneously supply the passive device, independently on which interface is activated. In a second variant, the power management unit determines which rectifier among the first and second rectifier delivers the higher power and selects this rectifier for supplying the passive device 2.

According to the invention, the passive identification device 2 is arranged so that the first non-volatile memory 28 ($1^{st}$ NVM) can be powered and be in an active state without powering the second non-volatile memory 30 ($2^{nd}$ NVM). Thus, it is possible to have access only to the first memory at least in a read mode. The $1^{st}$ NVM consumes substantially a first power in a read mode and the $2^{nd}$ NVM consumes substantially a second power in a read mode, the second power being substantially higher than the first power. To that effect, the $1^{st}$ NVM 28 has a smaller size than the $2^{nd}$ NVM 30. For example, the $1^{st}$ NVM has only 576 bits and the $2^{nd}$ NVM has 2688 bits. However, for the purpose of the present invention, the first non-volatile memory 28 comprises all data needed for a device configuration allowing this device to carry out at least a first communication mode of the UHF protocol, this first communication mode having access to this first non-volatile memory but not to the second non-volatile memory 30. The first non-volatile memory 28 further comprises all attributes needed for a configuration of the first communication mode of the UHF protocol.

The power management unit is arranged for detecting at least:
  a first determined power level provided by the power generator and required for the first communication mode of the UHF protocol to be carried out by the device,
  a second determined power level provided by the power generator and substantially higher than the first determined power level, this second determined power level being required for a communication mode of the HF protocol to be carried out by the device, this communication mode having access at least to the second non-volatile memory 30 which thus needs to be powered when this communication mode is active.

The device is further arranged for allowing the configuration of the first communication mode and then an execution of this first communication mode when the power provided by the power generator is equal or superior to the first determined power level. Finally, the device is arranged for allowing a full activation of the HF Interface together with the second non-volatile memory only when the power provided by the power generator is equal or superior to the second determined power level.

According to a main embodiment, the device is arranged for allowing the device reset means to be activated and then the device configuration to be executed when the power provided by the power generator is equal or superior to the first determined power level, the device being arranged so that the activation of the device reset means occurs before the configuration of the first communication mode of the UHF protocol. Further, in an initial phase of the UHF protocol configuration or before this configuration (depending on the given definition for such a configuration) or during the device reset, an UHF protocol reset is done.

According to a preferred embodiment, the first communication mode of the UHF protocol is a limited UHF communication mode (also named limited UHF protocol), i.e. with a limited access to the non-volatile memory means because only the $1^{st}$ NVM is active in this mode, and the UHF interface can further carry out an extended UHF communication mode (also named extended UHF protocol) with access to the $2^{nd}$ NVM when the power provided by the power generator is equal or superior to a third determined power level higher than the first power level. The power management unit 24 is arranged for detecting this third power level and for allowing a power supply of the second non-volatile memory only when the power provided by the power generator is equal or superior to the third power level. In this preferred embodiment, attributes relative to the second non-volatile memory for a configuration of the extended UHF communication mode are stored in this second non-volatile memory. In particular, the configuration of the extended UHF protocol is an additional configuration phase of the configuration of the limited UHF protocol, this additional phase mainly concerning the second non-volatile memory. In a particular embodiment, the extended UHF protocol could be different from the limited UHF protocol, i.e. not only an extension of the limited UHF communication mode. In such a case, the configuration of the extended UHF protocol can be done as soon as the power provided by the power generator is equal or superior to the third power level or only if a first request for accessing the second non-volatile memory is received.

According to an advantageous variant of the above-mentioned preferred embodiment, the device is arranged for executing at least partially the configuration of the extended UHF communication mode when the second non-volatile memory is in an active mode and only if an access command concerning this second non-volatile memory is received by the UHF interface. According to a particular variant, the identification device 2 is arranged so that the second non-volatile memory 30 is activated only if an access command concerning this second non-volatile memory is received by the UHF interface and then the at least partial configuration of the extended UHF communication mode is executed. However, in another variant, in order to speed up the access to the $2^{nd}$ NVM in the extended UHF communication mode, this $2^{nd}$ NVM is automatically activated as soon as the third power level has been detected by the power management unit.

In a particular variant, the second power level and the third power level have a same value and the detection of these second and third determined power levels by the power management unit correspond to a same event.

In another embodiment, the identification device further comprises an HF field detector and this device is arranged for allowing a power supply of the HF Interface only when the power provided by the power generator is equal or superior to the second determined power level and if an HF electromagnetic field is detected by the HF field detector. In the case of the above mentioned particular variant, the power ON for the $2^{nd}$ NVM is at the same power level than the power ON for the HF interface. However in the present embodiment, when this power level is detected, the HF interface will not automatically power up and add power consumption for the device 2 because this device further detects if an HF field is present before activating the HF interface. This means that the $2^{nd}$ NVM can be powered and used by the extended UHF protocol without activating the HF interface even if the power level allowing the activation of both is the same.

In a preferred variant, the passive identification device 2 is arranged for allowing a configuration of the HF protocol only when the HF interface is in an active state and when a first command according to said communication mode of the HF protocol has been received. In a preferred variant, the HF protocol attributes for a configuration of the HF communication mode are stored in the $2^{nd}$ NVM 30. Further, in an initial phase of the HF protocol configuration or before this configuration (depending on the given definition to such a configuration), an HF protocol reset can be done. However, at least a partial HF protocol reset can occur in a preceding step, for example during the device reset or after this device reset, if a part of the HF interface, for example the HF logic unit, has already been activated before. It is to be noted that some attributes of the HF protocol can be common to the UHF protocol so that these common attributes are in the $1^{st}$ NVM 28 and thus not considered here as part of the HF protocol configuration. Further, it may not be necessary to load again these common attributes from the UHF memory unless there is a possibility for reprogramming these common attributes through the UHF interface, because this UHF interface can be in an active state before the HF interface is activated. It would be possible to consider such common attributes as part of the device configuration, these attributes being loaded in a final phase of this device configuration.

The invention also concerns a configuration method of the identification device of the invention. More generally, a method of activation of the different interfaces and non-volatile memories and of configuration of the possible protocols or communication modes will be described in reference to FIG. 2.

First, the device reset means are activated when the first determined power level is detected by the power management unit after a power-down state of this identification device. This means that an initial reset is done at Power ON wherein this Power ON is selected at the lowest level relative to the power supply of the different protocols or of the different communication modes defined by these different protocols. In the present case, the Power ON is selected to allow a limited UHF communication mode to be carried out by the passive device 2. Thus, the device is automatically reset at UHF power ON for a limited UHF protocol, wherein only the $1^{st}$ NVM is powered and thus accessible, this event being indicated by 'UHF POR' in FIG. 2. Then, a device configuration is automatically executed. According to the invention, the device configuration data (Device Conf Data) are stored in the $1^{st}$ NVM 28 which is specifically designed to be associated with an UHF interface and to be involved in an UHF communication, in the present case according to the limited UHF communication mode of the EPC protocol.

The device configuration first allows to carry out the limited UHF protocol/communication mode and further may concern some additional configuration attributes relative to the HF channel/protocol. The device configuration first concerns the configuration of device resources which are needed for the functioning of the device and then which are common to all protocols, e.g. a persistence flag relative to a security timeout. Further, such a device configuration may also concern a specific protocol, in particular a mode selection for such a protocol or even a protocol selection. In a preferred variant, in order to limit the space needed in the $1^{st}$ NVM for the device configuration data, only the device attributes needed for the UHF communication protocol are loaded in this initial configuration. In a particular variant, the different allowed communication modes are also read during the device initialization.

For example, during the reset step or during the device configuration, the analog persistence flags are refreshed according to their stored state in the corresponding capacitors. Then, during the device configuration, trimming values are read in the $1^{st}$ NVM and the trimming of the UHF oscillator, of the voltage reference $V_{ref}$ and of the current reference $I_{ref}$ are executed. In an advantageous variant, a mode selection relative to the HF channel is already read in the $1^{st}$ NVM when this HF channel can be put in a muted state. Thus, before detecting a power level allowing the HF interface to be powered ON, the device 2 already knows if an HF communication is allowed or if the HF channel is only used as power source, i.e. if the HF interface is muted or not. In other variant, the mode selection can also concern a security level, e.g. if a privacy mode is implemented or if a defined security level is required for at least an interface or a protocol. It is to be noted that some data relative to the device configuration like mode selection data can be protected against tearing. Thus, the anti-tearing status bits corresponding to these data must also be read during the device configuration, these anti-tearing status bits being stored in the $1^{st}$ NVM.

After the device configuration, a configuration of the limited UHF protocol/communication mode is executed. In a first variant, the identification device is arranged so that the configuration of the limited UHF communication mode is automatically and directly executed after the device configuration if the power provided by the power generator remains equal or superior to the power level UHF Power ON (first power level to be detected and corresponding to the power level required for the device configuration, the activation of the UHF interface, the configuration of the limited UHF protocol and the execution of the limited UHF communication mode). In a second variant, the identification device 2 comprises an UHF field detector and the UHF protocol configuration is executed only if an UHF field is detected so that this initial configuration of the UHF protocol occurs only when an UHF field is present. It is to be noted that the border between the device configuration and the UHF protocol configuration is not absolute; it is for some attributes a question of definition. In this second variant, the mentioned refresh of the analog persistence flags is preferably done just after the detection of an UHF field.

The limited EPC protocol configuration concerns the anti-tearing protection status bits relative to the $1^{st}$ NVM, the UHF memory lock bits, the reading of persistence flags S2, S3, SL in order to know which have to be periodically refreshed for keeping their persistence, and a computing of the storedCRC, this list being not exclusive. The attributes not related to the cited persistence flags are stored in the first NVM 28.

After the limited UHF protocol configuration has been executed and when a UHF field is present, i.e. when a UHF field from a UHF reader is received by the identification device 2, a limited UHF communication can immediately take place. In the second variant mentioned before, such a situation normally exists because the limited UHF protocol configuration is executed only after having detected a UHF field corresponding to the resonance frequency of the UHF antenna.

During an activation of the UHF interface, the power management unit 24 further senses the power level of the power generator (or at least an electrical parameter linked to such power level). Concerning the activation of the HF interface together with the $2^{nd}$ NVM 30 which required a much higher power than for the activation of the UHF interface and the $1^{st}$ NVM, the power management unit detects if an HF Power ON level is reached to allow such an activation. In a preferred variant, as represented in FIG. 2, the identification device comprises an HF field detector and this HF field detector detects if a field corresponding to the resonance frequency of the HF antenna circuit is received by the device. Only if this is the case, an activation of the HF interface is done together with the powering of the $2^{nd}$ NVM, this activation being implemented so that a first command according to the NFC protocol can be received and decoded (this could requires a first phase of the HF protocol to be first executed by reading some attributes preferably stored in the $2^{nd}$ NVM).

If a first request from an HF reader of the communication system is received, then a configuration of the NFC protocol is executed, mainly during a response to this first request which does not need the attributes of the NFC protocol loaded during this response. The attributes of the NFC protocol stored in the second non-volatile memory concern the anti-tearing status bits for the $2^{nd}$ NVM, the memory lock bits concerning the $2^{nd}$ memory and the sharing lock bits concerning the $1^{st}$ NVM. It is to be noted that, in the main variant here described with an UHF protocol and an HF protocol and two distinct non-volatile memories, each NVM is associated with 'memory lock bits' related to a first protocol, for which this NVM is first designed, and also with 'sharing lock bits' related to the access to this NVM by the second protocol. If a first configuration phase has already occurred, the NFC configuration during the response to the HF reader will concern a second phase of this NFC protocol configuration. It is also to be mentioned that some common attributes with the UHF protocol configuration already loaded before may not need to be loaded again. However, it is possible that some attributes already loaded before the detection of the HF field have to be loaded again in order to have their respective actual states. During this HF configuration, data and attributes stored in the $1^{st}$ NVM or in the $2^{nd}$ NVM can be read because the $1^{st}$ NVM remains in an active state. As already mentioned, it is a preferred variant of the present invention to put in the $1^{st}$ NVM only few data in order to keep the size of this $1^{st}$ NVM substantially as low as possible. Thus, in this preferred variant, all attributes of the HF protocol which are not common to the UHF protocol are stored in the $2^{nd}$ NVM 30. After the NFC configuration has been executed, a standard HF communication according to the NFC protocol occurs. It is to be mentioned that, in a preferred variant, the $1^{st}$ NVM is first designed for an EPC protocol. However, through an appropriate mapping, this $1^{st}$ NVM can also be accessed by the HF interface during the execution of an HF communication. This is also the case in the write mode wherein the $1^{st}$ NVM can be programmed via the HF interface.

According to a preferred embodiment, when the power provided by the power generator is equal or superior to a third determined power level, corresponding to the power needed for the activation of the $2^{nd}$ NVM in addition to the UHF interface and the $1^{st}$ NVM, an extended NFC protocol can be activated in which a read access to the $2^{nd}$ NVM is allowed. According to a particular variant of the configuration method of the invention, a partial or full configuration of the extended UHF communication mode is executed by reading attributes relative to this second non-volatile memory stored in this second non-volatile memory only if an access command concerning the second non-volatile memory is received by the UHF interface, the partial configuration being related to at least a part of the second non-volatile memory concerned by the access command. Thus, an extended UHF communication mode according to this particular variant will occur only after the power management unit has detected the third power level, which is between the mentioned first and second power levels, and if a UHF request for accessing the $2^{nd}$ NVM is received, i.e. if a request for the implementation of the extended UHF protocol is received through the UHF interface (UHF Request for Ext UHF Prot' in FIG. 2). The additional attributes of the UHF protocol linked to the extended communication mode are preferably stored in the $2^{nd}$ NVM. This additional attributes defining the extended UHF configuration mainly concern the $2^{nd}$ NVM, in particular sharing lock bits (defining which parts of the $2^{nd}$ NVM can be accessed by the UHF protocol) and also anti-tearing status bits relative to the $2^{nd}$ NVM. It is to be noted that this $2^{nd}$ NVM is first designed to fit with the NFC protocol. However, through an appropriate mapping of this $2^{nd}$ NVM, at least parts of the $2^{nd}$ NVM 30 can be read during an extended UHF communication.

As already mentioned, the second and third power levels can correspond to a common power level. However, in the described activation and configuration method, even in such a case, a spurious extended UHF communication mode or a spurious HF interface activation will not occur when this common power level is reached.

The UHF field detector and the HF field detector can each be formed in a first variant by a frequency detector (frequency discriminator) or in a second variant by a voltage detector arranged after the UHF rectifier respectively after the HF rectifier (this voltage detector detecting if a given voltage level has been reached). In a specific variant, the field detector may also comprise a preamble detector showing that a certain modulation of the carrier frequency occurs.

What is claimed is:

1. Dual frequency RF identification device comprising an HF antenna for receiving an HF electromagnetic field, an HF interface, an UHF antenna for receiving an UHF electromagnetic field, an UHF interface, non-volatile memory means, device reset means, a power generator and a power management unit, the HF interface being arranged for carrying out an HF protocol and the UHF Interface being arranged for carrying out an UHF protocol; wherein the non-volatile memory means are formed at least by a first non-volatile memory and a second non-volatile memory, the identification device being arranged so that the first non-volatile memory can be powered and be in an active state without activating the second non-volatile memory, the first non-volatile memory consuming substantially a first power in a read mode and the second non-volatile memory consuming substantially a second power in a read mode, the second power being substantially higher than the first power; wherein the first non-volatile memory comprises all data needed for a device configuration allowing this device to carry out at least a communication mode of said UHF protocol, this communication mode having access to the first non-volatile memory but not to the second non-volatile memory, the first non-volatile memory further comprising all attributes needed for a configuration of said communication mode;

wherein the power management unit is arranged for detecting:
a first determined power level provided by said power generator and required for said communication mode of the UHF protocol to be carried out by the device,
at least a second determined power level provided by said power generator and substantially higher than the first determined power level, this second determined power level being required for a communication mode of said HF protocol with an access at least to said second non-volatile memory to be carried out by the device;
wherein the device is further arranged for allowing said configuration of said communication mode of the UHF protocol and then an execution of this communication mode when the power provided by the power generator is equal or superior to the first determined power level, and wherein the device is arranged for allowing a full activation of the HF Interface together with the second non-volatile memory only when the power provided by the power generator is equal or superior to the second determined power level.

2. Identification device according to claim 1, wherein the device is arranged for allowing said device reset means to be activated and then said device configuration to be executed when the power provided by the power generator is equal or superior to the first determined power level, the device being arranged so that the activation of the device reset means occurs before the configuration of said communication mode of the UHF protocol.

3. Identification device according to claim 1, wherein said communication mode of the UHF protocol is a limited UHF communication mode; wherein the UHF interface can further carry out an extended UHF communication mode of said UHF protocol with an additional access to the second non-volatile memory when the power provided by the power generator is equal or superior to a third determined power level higher than the first determined power level; wherein said power management unit is arranged for detecting this third determined power level and for allowing an activation of the second non-volatile memory only when the power provided by the power generator is equal or superior to said third determined power level; and wherein attributes relative to the second non-volatile memory for a configuration of the extended UHF communication mode are stored in this second non-volatile memory.

4. Identification device according to claim 3, wherein this device is arranged for executing at least partially said configuration of the extended UHF communication mode when the second non-volatile memory is in an active state and only if an access command concerning this second non-volatile memory is received through the UHF interface.

5. Identification device according to claim 3, wherein this device is arranged so that the second non-volatile memory is activated only if an access command concerning this second non-volatile memory is received through the UHF interface.

6. Identification device according to claim 3, wherein the second determined power level and the third determined power level have a same value and wherein the detection of these second and third determined power levels by the power management unit corresponds to a same event.

7. Identification device according to claim 6, wherein this device further comprises a HF field detector; and wherein this device is further arranged for allowing an activation of the HF Interface only if an HF field is detected by the HF field detector.

8. Identification device according to claim 7, wherein this device is arranged for allowing a configuration of the HF protocol only when the HF interface is in an active state and if a first command according to said communication mode of the HF protocol is received; and wherein HF protocol attributes for a configuration of this communication mode are stored in the second non-volatile memory.

9. Identification device according to claim 3, wherein this identification device is of the passive type; and wherein the power generator comprises first rectifying means for a received UHF electromagnetic field and second rectifying means for a received HF electromagnetic field, the first rectifying means providing a supply voltage to the device at least when the power generated by the first rectifying means is higher than the power generated by the second rectifying means.

10. Configuration method of a dual frequency RF identification device according to claim 9, wherein, when the power provided by the power generator is equal or superior to said third determined power level and the first non-volatile memory is in an active state, a partial or full configuration of the extended UHF communication mode is executed by reading attributes relative to this second non-volatile memory stored in this second non-volatile memory only if an access command concerning the second non-volatile memory is received through the UHF interface, the partial configuration being related to at least a part of the second non-volatile memory concerned by the access command.

11. Identification device according to claim 1, wherein this device further comprises an HF field detector; and wherein this device is further arranged for allowing an activation of the HF Interface only if an HF field is detected by the HF field detector.

12. Identification device according to claim 11, wherein this identification device is of the passive type; and wherein the power generator comprises first rectifying means for a received UHF electromagnetic field and second rectifying means for a received HF electromagnetic field, the first rectifying means providing a supply voltage to the device at least when the power generated by the first rectifying means is higher than the power generated by the second rectifying means.

13. Identification device according to claim 1, wherein this device is arranged for allowing a configuration of the HF protocol only when the HF interface is in an active state and if a first command according to said communication mode of the HF protocol is received; and wherein HF protocol attributes for a configuration of this communication mode are stored in the second non-volatile memory.

14. Identification device according to claim 1, wherein this identification device is of the passive type; and wherein the power generator comprises first rectifying means for a received UHF electromagnetic field and second rectifying means for a received HF electromagnetic field, the first rectifying means providing a supply voltage to the device at least when the power generated by the first rectifying means is higher than the power generated by the second rectifying means.

15. Configuration method of a dual frequency RF identification device according to claim 14, wherein the device reset means are activated when the first determined power level is detected by the power management unit after a power-down state of the identification device and then the device configuration is automatically executed if the power provided by the power generator remains equal or superior to this first determined power level.

16. Configuration method of a dual frequency RF identification device according to claim 15, wherein the configuration of said communication mode of the UHF protocol is automatically and directly executed after the device configuration if the power provided by the power generator remains equal or superior to the first determined power level.

* * * * *